the

US005607310A

United States Patent [19]
Cholley

[11] Patent Number: 5,607,310
[45] Date of Patent: Mar. 4, 1997

[54] PORTABLE DEVICE INTENDED FOR THE LEARNING OF A LANGUAGE

[76] Inventor: Sylvain Cholley, 1 rue du Bèlvédère, 92400 Ville d'Avray, France

[21] Appl. No.: 236,045

[22] Filed: May 2, 1994

[30] Foreign Application Priority Data

May 6, 1993 [FR] France .................................. 93 05425

[51] Int. Cl.⁶ .................................................. G09B 19/06
[52] U.S. Cl. ........................... 434/157; 434/156; 434/167
[58] Field of Search .................... 434/156, 157, 434/167, 169, 178, 185; 364/419.01–419.05

[56] References Cited

U.S. PATENT DOCUMENTS 4,380,438  4/1983  Okamoto .
4,591,929  5/1986  Newsom .
5,087,205  2/1992  Chen .

FOREIGN PATENT DOCUMENTS 0478443   4/1992  European Pat. Off. .
4129129   3/1992  Germany .
2254725  10/1992  United Kingdom .

Primary Examiner—Richard J. Apley
Assistant Examiner—Glenn E. Richman
Attorney, Agent, or Firm—Oliff & Berridge

[57] ABSTRACT

A portable device facilitates learning of a language based on recorded linguistic expressions of at least two types. The portable device includes an apparatus for reading each linguistic expression from the medium. A memory within the portable device stores linguistic expressions in various zones in accordance with an identifying marker. The voice of a user can be recorded by a recording portion of the portable device. A monitoring device enables monitoring of the user's voice and of the linguistic expressions retrieved from storage. A central unit is programmable by the user to cause the portable device to execute a desired instruction sequence.

15 Claims, 2 Drawing Sheets

PORTABLE DEVICE INTENDED FOR THE LEARNING OF A LANGUAGE

The present invention concerns a portable device for learning a language on the basis of linguistic expressions recorded on a medium read by the device.

Language laboratories for the learning of foreign languages are well known. When a user wishes to use such a laboratory independently, he has access to a tape recorder installed in a cabin of the laboratory with magnetic tapes on which are recorded linguistic expressions to which the user listens and then repeats in order to perfect his accent, the said linguistic expressions usually being accompanied by their translation. However access to language laboratories is not always easy owing to their times of opening or their geographical location. Moreover the operation of the tape recorder quickly becomes tiresome when the user wishes to listen to a given linguistic expression a number of times, in which case the said user must repeatedly rewind the tape recorder. Similarly, the user must operate the tape recorder in fast forward mode after practising a linguistic expression when he does not wish to listen to the accompanying translation.

The present invention aims to facilitate the learning of a foreign language and pertains to a perfected portable device designed for learning this language on the basis of linguistic expressions recorded on a medium read by the device.

SUMMARY OF THE INVENTION

According to an initial characteristic of the invention, the linguistic expressions are organised on the medium in sequences consisting of one reference linguistic expression in the language to be learned and at least one other linguistic expression of a different type, these linguistic expressions being preceded by identifying markers, and the device includes:

- a central unit, programmable by the user to execute a specific program comprising an iteration;
- means for intermittently reading the said medium, the reading being instructed by the said central unit at the commencement of execution of the program to read a sequence recorded on the medium;
- a memory;
- means for storing, during the reading of the medium, at least one linguistic expression of a given type in a specific zone of the said memory designated by the central unit after identifying the marker which precedes it;
- means of recording for storing, during the execution of a record instruction of the said program and in a specific zone of the said memory, a signal supplied by a microphone and corresponding to a linguistic expression spoken by the user;
- means for retrieving for the purposes of monitoring, during the execution of a monitoring instruction from the said program, a linguistic expression of a given type, stored in a specific zone of the said memory selected by the said central unit;
- means of control whereby the user can exit from the current iteration and initiate a further execution of the program for the following sequence;
- means whereby the user can programme the said central unit such that the said unit can define, for each sequence, the type of linguistic expression to which he wishes to listen and the instructions contained in the iteration.

With advantage the said iteration comprises a record instruction and the said means of control causes an exit from the iteration and the initiation of a new execution of the program in the absence of any signal from the microphone during the execution of the record instruction.

In an advantageous embodiment of the invention, the means of reading are controlled by the said central unit at the commencement of execution of the program so as also to read the first n linguistic expressions of particular types in the following sequence and these first n linguistic expressions are stored by the said means of storage in specific zones of the said memory designated by the central unit, so as to permit, when a further execution of the program is initiated, monitoring of the first linguistic expression read at the same time as it is stored.

When the number n is equal to 1, the said means of storage and retrieval preferably include two converters each capable of analogue/digital and digital/analogue conversion, one of them being associated with two specific zones in the memory serving respectively for storing the reference linguistic expression and for storing the linguistic expression spoken by the user, and the other being associated with two specific zones in the memory assigned respectively to storing a linguistic expression corresponding to the translation into the user's language of the said reference linguistic expression and for storing the first linguistic expression of a given type in the following sequence.

With advantage the said linguistic expressions and the said markers are recorded respectively on the two tracks of a stereophonic recording and the said medium consists of a magnetic tape.

In an advantageous embodiment of the invention, the device comprises a display system and means for controlling this display system for displaying the program defined by the user and means of programming comprising a selection key causing the different possible programming instructions to scroll on the display system and a validation key for entering the selected displayed instruction into the program.

BRIEF DESCRIPTION OF THE DRAWING

Other features and advantages of the present invention will become clear from the following detailed description of a non-limiting embodiment of the invention and from the attached drawing on which.

DETAILED DESCRIPTION OF PREFERRED EMBODIMENT

Figure 1:
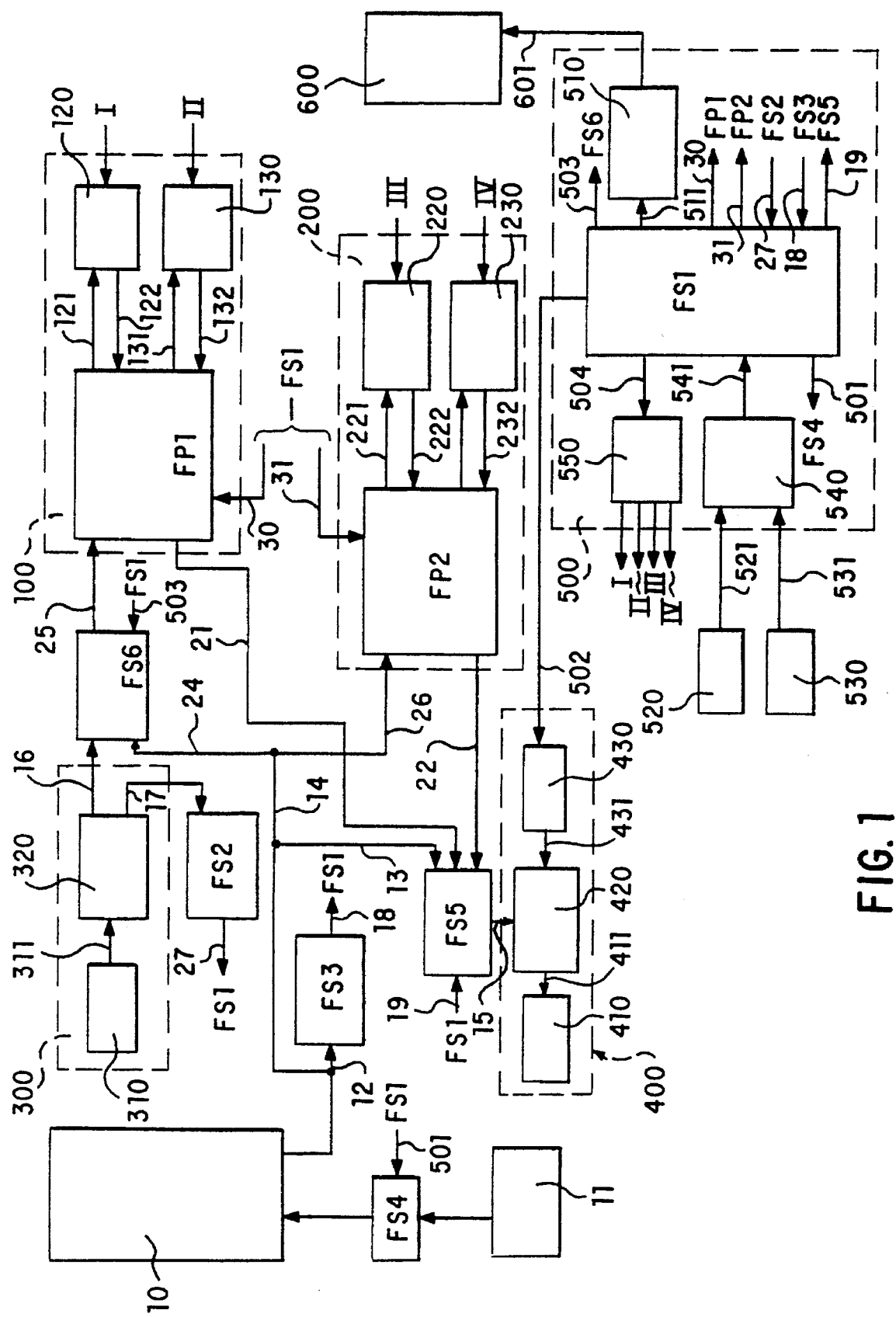
FIG. 1 is a schematic diagram of the device.
Figure 2:
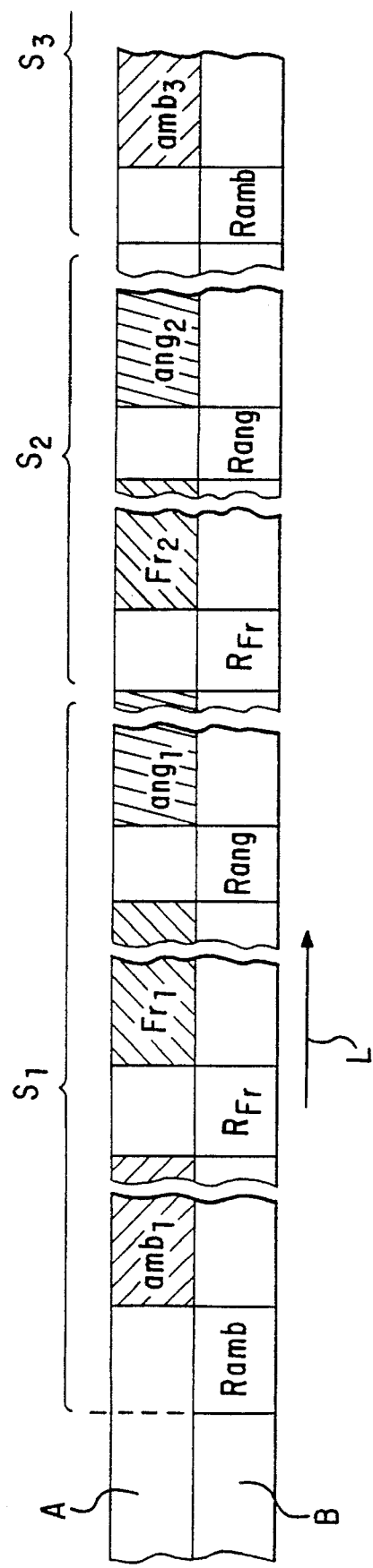
FIG. 2 shows the organisation of the linguistic expressions on the medium.

On FIG. 1, reference 10 designates means of reading a medium on which linguistic expressions are recorded. The medium, may be a magnetic tape as shown in FIG. 2. The linguistic expressions are organized on this magnetic tape as shown on FIG. 2, in sequences S1, S2, S3, etc., each consisting of a reference linguistic expression (designated for the successive sequences S1, S2, . . . respectively by "Eng1", "Eng2", . . . ) in the language to be learned (in this example, English) and of at least one linguistic expression (designated by "Fr1", "Fr2", . . . respectively for the successive sequences S1, S2, ...) of a different type) in this example the French translation of the linguistic expressions "Eng1" and "Eng2", ...).

All the linguistic expressions are recorded on a track A of a stereophonic recording and they are preceded on the other track B by markers consisting of signals coded in a known manner so as to permit identification. More particularly, in the example described, the first sequence S1 comprises a linguistic expression "amb1", intended to indicate the context of the following expressions, then a linguistic expression "Fr1", corresponding to the French translation of the reference linguistic expression in English "Eng1" which follows. The second sequence S2 begins with a linguistic expression "Fr2", corresponding to the French translation of the reference linguistic expression in English "Eng2" which follows. The third sequence S3 begins with a linguistic expression "amb3", intended to indicate the context of the following expressions.

Each linguistic expression in a sequence is preceded on track B by a specific marker placed on the tape during recording, designated respectively by Ramb, REng and RFr depending upon whether it is followed by an expression intended to indicate the context, a reference expression or an expression corresponding to the translation of this reference expression.

In the embodiment described the reading means 10 consist of a portable stereophonic tape recorder and the medium is a magnetic tape. This tape recorder is powered intermittently from a source of electrical power 11, consisting of cells or batteries, connected to the tape recorder through first switching means FS4, controlled by a central unit FS1.

According to the invention, the central unit FS1 is programmable to execute a program defined by the user and comprising an iteration. A tape recorder 10 is controlled by the central unit FS1 at the commencement of execution of the program to read a sequence recorded on the tape. More precisely, when the central unit FS1, connected at 501 to the first switching means FS4, transmits a read control signal, the said switching means supply electric power to the tape recorder 10.

The tape recorder 10 then reads the tape and transmits a stereophonic signal on two channels A and B corresponding to the reading of tracks A and B respectively. Channel B is fed at 12 to means FS3 for identifying the markers and channel A is fed at 13 and 14 respectively to monitoring means 400 and storage and retrieval means which will be specified later. The means of identification FS3 can supply a signal at 18 to the central unit FS1 indicating to the said central unit the type of linguistic expression which follows the marker read.

The monitoring means 400 comprise headphones 410 connected at 411 to the output of an amplifier 420. This amplifier 420 amplifies an input signal received at 15 with a gain modifiable by the user so as to adjust the audio volume in the headphones 410. The gain is adjusted by means of two control keys 520 and 530 connected at 521 and 522 to an interface 540 which itself is connected at 541 to the central unit FS1 which supplies at 502, in response to actions at the keys 520 and 530, an audio volume control signal, designed to increase or reduce the said signal respectively, to means 430 of controlling the gain of the amplifier 420, connected to the said amplifier at 431.

The signal fed at 13 to the monitoring means 400 leads at one of the inputs to second switching means FS5 comprising three inputs and one output connected at 15 to the amplifier 420. The second switching means FS5 are adapted to feed the signal received at 13 to the input of the amplifier 420 when they receive at 19 a monitoring control signal emitted by the central unit FS1. When this monitoring control signal is present, the linguistic expression read is fed to the headphones 410.

In the embodiment described, the above-mentioned means of storage and retrieval comprise two converters FP1 and FP2 each able to digitise the analogue signal fed to 14 by the tape recorder 10 with a view to storing it in a memory. These two converters FP1 and FP2 are also able to retrieve the signal stored in digital form in the said memory in the form of an analogue signal fed to 21 and 22 respectively for the converters FP1 and FP2 to the other two inputs of the second switching means FS5.

In the embodiment described the memory is divided into four specific zones. More particularly, the first converter FP1 is associated with two specific zones referenced 120 and 130 and the second converter FP2 is associated with two specific zones referenced 220 and 230. The converter FP1 and the two related specific zones 120 and 130 are combined on a first integrated circuit 100 well known in itself. The converter FP2 and the two specific zones 220 and 230 are combined on a second integrated circuit 200 identical with the first.

The signal fed to 14 by the tape recorder 10 reaches at 24 one of the inputs of the third switching means FS6 comprising two inputs and one output connected at 25 to the first converter FP1. The signal fed to 14 by the tape recorder 10 terminates directly at 26 on the second converter FP2. The other input of the third switching means FS6 is connected at 16 to recording means 300. The said recording means comprise an amplifier 320 which at its input 311 receives a signal from a microphone 310. The input to the amplifier 320 is preferably fitted with a signal compressor known in itself making any adjustment of recording level unnecessary. As described above the output of the amplifier 320 is connected at 16 to the third switching means FS6 and at 17 to control means FS2 designed to detect the absence of a signal transmitted by the microphone 310 to feed in this case a special signal at 27 to the central unit FS1. The third switching means FS6 are controlled at 503 by the central unit FS1 to direct as appropriate the signals received at 16 and 24 to the first converter FP1.

The converters FP1 and FP2 are controlled at 30 and 31 respectively by the central unit FS1, according to the type of signal transmitted by the said unit, for writing in the specific zones of the memory or for reading the content of the said zones with retrieval to the monitoring means 400. The specific zone in which the converters FP1 and FP2 are to read or write is designated by the central unit FS1 through means 550 managing the specific memory zones, receiving as an input at 504 an addressing signal from the central unit FS1 and capable of decoding this signal in order to indicate the specific zone concerned at the output by a signal transmitted at I, II, III or IV to the integrated circuits 100 and 200.

The device according to the invention also comprises a liquid crystal display system 600 connected at 601 to means 510 for controlling this display system, themselves connected at 511 to the central unit FS1.

With advantage the central unit FS1 is programmed by means of the above-mentioned keys 520 and 530.

The operation of the device will now be described with reference to the sequences S1 and S2 recorded on the tape, the content of which has already been described.

The user first inserts the cassette into the tape recorder and then switches on the device. In the embodiment described, the program defined by the user contains a maximum of seven successive instructions and the central unit FS1 preferably programmes itself when switched on according to a given program residing in the read-only memory of the central unit. In the embodiment described the set of instructions available to the user is as follows: FR, GB, REC, MON, RETURN x.

The instruction FR is for listening to a linguistic expression corresponding to the French translation (or more generally in a language that the user knows) of the reference linguistic expression contained in the sequence.

The instruction GB is for listening to the reference linguistic expression in English (or more generally in any other language to be learned) contained in the sequence.

The instruction REC is for recording a linguistic expression spoken into the microphone by the user.

The instruction MON is for listening to the linguistic expression spoken by the user.

The instruction RETURN, followed by a number x of program steps, is used for creating an iteration and for the iterative execution of the instructions contained between the program step x and the program step containing the instruction RETURN.

The program residing in the read-only memory of the central unit FS1 and programmed at switch-on is the following for example:
1: FR
2: GB
3: REC
4: MON
5: RETURN 2
6:
7:
This programming corresponds to listening to a sentence in French and then a sentence in English, recording the user and then listening to this recording and returning to listen to the sentence in English, and so on. When the system is switched on and before the program is run, the different programmed instructions scroll on the display system 600. To modify one or more instructions of the program, the user presses the key 520 known as the selection key, when the number of the programming step and the instruction contained therein, which he wants to modify, appears on the display system. For example if the user wishes to modify the programming steps 4 and 5 in order to enter the instructions GB and MON respectively, the user presses the selection key 520 when the fourth programming step appears on the display system. The central unit FS1 is designed to stop scrolling at that moment. The display system 600 then shows:
4: MON
The central unit FS1 is also adapted to scroll all the possible instructions to be programmed when the key 520 is pressed a number of times in sequence. The display system indicates in turn:
4: FR
4: GB
4: REC
4: MON
4: RETURN
When the display system shows:
4: GB
the user presses the key 530, known as the validation key, to enter the instruction GB into the program. The central unit FS1 is designed then to scroll the content of the program once again on the display system 600. In order to modify the fifth programming step, the user proceeds in the same way.

If the user selects the instruction RETURN and presses the validation key 530, he then selects the number x of the programming step accompanying this instruction, by pressing the selection key 520 several times in succession. The display system shows in turn:
RETURN: 1,
RETURN: 2,
RETURN: 3,
RETURN: 4,
RETURN: 5,
RETURN: 6,
RETURN: 1, . . .
The user presses the validation key 530 when the display system shows the number x of the step he wishes to enter.

In the following it will be assumed that the unit is programmed in the following manner:
1: FR
2: GB
3: REC
4: MON
5: RETURN 2.
After programming the central unit, the user runs the program by setting the tape recorder 10 to play. The keys 520 and 530 then no longer serve for programming but for adjusting the audio volume in the headphones as described above.

At the commencement of execution of the program, the central unit FS1 instructs the tape recorder 10 to read the first sequence S1 recorded on the cassette. A read control signal is therefore fed at 501 to the first switching means FS4. During reading of the tape according to the arrow 1, the identification means FS3 detect and identify the marker Ramb transmitted on channel B and preceding the linguistic expression intended to indicate the context "amb1", which will then be transmitted on channel A. The identification means FS3 notify the central unit FS1 that the coming expression is a linguistic expression intended to indicate the context, and the central unit FS1 is preprogrammed not to store in the memory this type of linguistic expression which is simply to be listened to by the user, at the same time as it is read by the tape recorder 10. The second switching means FS5 therefore receive, at 18 a control signal transmitted by the central unit FS1 instructing them to transmit the signal received at 13 to the amplifier 420. After monitoring the linguistic expression "amb1", the identification means FS3 detect and identify the marker RFr present on channel B and indicate by a special signal at 18 to the central unit FS1 that this is a linguistic expression corresponding to the translation of a reference linguistic expression. The central unit FS1 is preprogrammed to store this type of linguistic expression. Since the program defined by the user comprises the instruction FR as the first programming step, the linguistic expression "Fr1" will be monitored at the same time as it is stored. The second switching means FS5 are therefore instructed at 19 to transmit the signal received at 13 to the input of the amplifier 420. The linguistic expression "Fr1" is stored in the specific zone 220 designated by feeding an appropriate signal at III transmitted by the memory management means 550, under the control of the central unit FS1. The converter FP2 receives at 26 the analogue signal transmitted on channel A by the tape recorder 10 during reading of the linguistic expression "Fr1" and at the same time it is instructed at 31 by the central unit FS1 to write in the specific zone 220. The analogue signal is converted into a digital signal and transferred at 221 into the specific zone 220. After simultaneous monitoring and storage of the linguistic expression "Fr1", the identification means FS3 detect the marker REng and notify the central unit FS1 that the expression following on channel A is a reference linguistic expression in English. The central unit FS1 is preprogrammed to store this type of linguistic expression. The said storage will take place simultaneously with monitoring since the second instruction in the program defined by the user is GB. The second switching means FS5 are therefore instructed at 19 by the central unit FS1 to transmit the signal received at 13 to the input of the amplifier 420. The reference linguistic expression in English is stored in the specific zone 130 of the memory, designated by the transmission to II of an appropriate signal from the memory management means 550. The third switching means FS6 are instructed to transmit the signal received at 24 to the input 25 of the first converter FP1. The said converter is simultaneously instructed to write in the specific zone 130 by the reception at 30 of an appropriate command signal from the central unit FS1. The analogue signal transmitted on channel A is converted to digital form and transferred at 131 into the specific zone 130.

Figure 3:
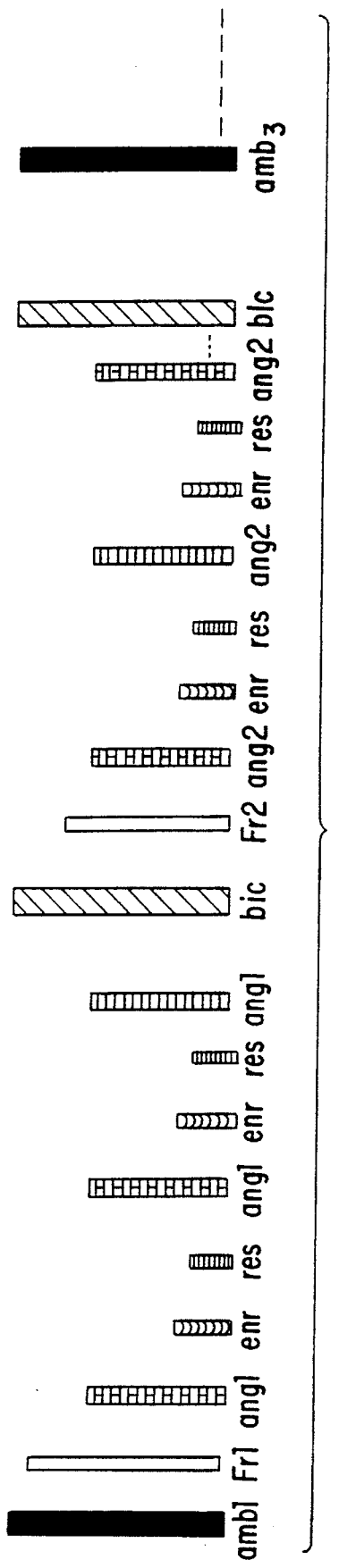
FIG. 3 illustrates the sequence of monitoring and recording operations corresponding to the execution of a given program by the central unit.

The tape continues to run and the identification means FS3 then detect a new marker RFr. The central unit is preprogrammed to recognise this as the end of a sequence. The central unit FS1 then executes the next instruction in the program which in the example described is the record instruction REC. The linguistic expression spoken by the user into the microphone 310 is stored in the specific zone 120 of the memory, designated by the transmission at I of an appropriate signal from the memory management means 550. The third switching means FS6 are instructed to direct the signal transmitted at 16 by the amplifier 320 to the input of the first converter FP1. The said converter receives a write command signal at 30 and the signal received at 25 is converted to digital form and transferred at 121 into the specific zone 120. Recording of the user continues for a specific period of time, fixed in the example described at 20 seconds. The central unit FS1 then executes the next instruction which in the case described is the monitoring instruction MON for the sentence recorded by the user. The first converter FP1 then receives at 30 an instruction from the central unit FS1 to read the specific zone 120 of the memory, designated by the transmission to I of an appropriate signal from the management means 550 and the content of the said zone is transferred to 122 to reconstitute an analogue signal fed at 21, to the amplifier 420, through the second switching means FS5 instructed to direct the signal provided by the converter FP1 to the input of the amplifier 420. After executing the monitoring instruction MON, the central unit FS1 encounters the instruction RETURN 2 and once again executes the instruction, contained in the second programming step, i.e., the instruction to monitor the reference sentence in English. The process is repeated according to FIG. 3 until the control means FS2 detect silence on the part of the user or a blank BLC during execution of the record instruction REC and feeds at 27 a special signal to the central unit FS1. The said central unit is preprogrammed to interpret this signal as indicating a halt to execution of the current iteration, the commencement of a new execution of the program and the change to the next sequence S2.

With advantage the central unit FS1 is preprogrammed to continue to instruct the reading means 10 to read, after detecting the end of the first sequence S1, so as to store in the specific zone 230 of the memory the linguistic expression "Fr2" of the second sequence S2, corresponding to the translation of the reference linguistic expression "Eng2". Storing the first linguistic expression of a given type—here the French translation of the reference linguistic expression—becomes important when the first instruction in the program is an instruction other than to monitor this first linguistic expression.

Let us assume for example that the program defined by the user is the following:

1: GB
2: REC
3: MON
4: FR
5: RETURN 1.

In this case, following detection of user silence during execution of the record instruction REC and initiation of a new execution of the program for the second sequence S2, the linguistic expression "Fr2" is already stored in the specific zone 230 of the memory and when the reading means 10 are again instructed to read the second sequence S2 by the central unit FS1, this read-out begins directly with the reference linguistic expression "Eng2".

Since the first instruction in the program is to monitor this expression, this can be done simultaneously with its storage in the specific zone 130 of the memory.

Next come the record and read instructions REC and MON causing the transfer at 121 into the specific zone 120 of the memory then the retrieval at 122 of the content stored. Execution of instruction FR then causes the transfer at 232 of the content stored in the specific zone 230 and its retrieval by the monitoring means 400. Execution of the instruction RETURN 1 causes a further execution of the monitoring instruction GB and the transfer at 132 of the content stored in the specific zone 130, and so on.

The idea of iteration should be taken in a broad sense and may also designate for example the execution of a loop containing no particular monitoring or record instruction and whose only role would be to await detection of a command signal from the user indicating the end of the waiting period and the initiation of a new execution of the program for the next sequence.

As an indication, the integrated circuits 100 and 200 are of the type known under the commercial reference UM 93 510A.

The amplifier 320 consists with advantage of an integrated amplifier available on the integrated circuit type UM 93 510A.

The means of control FS2 are of a type known under the commercial reference LM 393.

The third switching means are of a type known under the commercial reference 74 IIC 4052.

The means of identification FS3 are of a type known under the commercial reference MT 3270.

The amplifier 420 is of a type known under the commercial reference TL 072 and the gain control means of a type known under the commercial reference X 9103.

The display system 600 is of a type known under the commercial reference LTN 111 R10.

The means for entry 540, for memory management 550 and for control 510 of the display system 600 are combined with the central unit FS1 in an assembly 500 consisting of two integrated circuits of a type known under the commercial references 80 C 31 and 27 C 64.

The present invention is not limited to the embodiment described above as an example. It is possible in particular to propose, without departing from its principle, other types of medium, for example optical discs. It is also possible to propose control means FS2 operating other than by detecting a silence on the part of the user, for example by detecting pressure exerted on a control key. It is also possible to propose increasing the number of programmable instructions in order to adapt the device to the learning of several foreign languages recorded on one and the same medium.

I claim:

1. A portable device for learning of a language by a user based on types of linguistic expressions recorded on a medium, wherein the linguistic expressions are organized on the medium in sequences comprising a reference linguistic expression in the language to be learned and at least one other linguistic expression of a different type, these linguistic expressions being preceded by identifying markers, wherein the portable device comprises:

a central unit, programmable by the user to execute a defined program comprising an iteration;

means for intermittently reading the medium, controlled by the central unit at commencement of execution of the program in order to read one of the sequences recorded on the medium;

a memory divided into specific zones;

means for storing, during reading of the medium, at least one linguistic expression of a given type in one of the specific zones of the memory designated by the central unit following identification of an identifying marker preceding the linguistic expression of a given type;

recording means for storing, during execution of a record instruction of the program, in a specific zone of the memory a signal supplied by a microphone and corresponding to a linguistic expression spoken by the user;

means for retrieving and feeding to monitoring means during execution of a monitoring instruction of the program, the linguistic expression of a given type, stored in one of the specific zones of the memory selected by the central unit;

control means allowing the user to exit from a current iteration and to initiate a new execution of the program for a next sequence;

means whereby the user may program the central unit to enable the unit to define for each sequence the type of linguistic expressions to which the user wishes to listen and instructions contained in the iteration.

2. The portable device according to claim 1, wherein the iteration comprises a record instruction and the control means cause the exit from the iteration and the initiation of a new execution of the program in the absence of any signal from the microphone during execution of the record instruction.

3. The portable device according to claim 1, wherein the reading means are controlled by the central unit at the commencement of execution of the program to read a given number of linguistic expressions of given types from a following sequence and in that the given number of linguistic expressions is stored by the storage means in a number of the specific zones of the memory designated by the central unit, so as to permit, when the program is next run, monitoring of a first linguistic expression read and stored simultaneously.

4. The portable device according to claim 3, wherein the given number is equal to 1.

5. The portable device according to claim 4, wherein the means of storage and retrieval comprises two converters each capable of analog/digital and digital/analog conversion, one of the two converters associated with two of the specific zones of the memory assigned respectively to storing the reference linguistic expression and to storing the linguistic expression spoken by the user, and another of the two converters associated with two other specific zones of the memory assigned respectively to storing a linguistic expression corresponding to a translation in the user's language of the reference linguistic expression and to the storage of a first linguistic expression in the user's language of the following sequence.

6. The portable device according to claim 1, wherein the linguistic expressions and the identifying markers are each recorded on one of the two tracks of a stereophonic recording.

7. The portable device according to claim 1, characterised in that the media consist of a magnetic tape.

8. The portable device according to claim 1, wherein the portable device comprises a display system and means of controlling the display system in order to display the program defined by the user and wherein the means of programming comprise a selection key for causing possible programming instructions to scroll on the display system and a validation key for entering a selected displayed instruction into the program.

9. A portable device for learning a language using linguistic expressions recorded on a medium, wherein the linguistic expressions are arranged in sequences comprising at least one reference linguistic expression in the language, and at least one different type linguistic expression, each of said linguistic expressions preceded by an identifying marker, the portable device comprising:

a reading apparatus that reads each reference linguistic expression, each different type linguistic expression, and each identifying marker from the medium;

a memory for storing at least one of the linguistic expressions in accordance with the identifying marker for the at least one linguistic expression;

a recorder that records signals from a microphone;

monitoring means for allowing monitoring of the linguistic expressions and the signals;

a programmable central unit for controlling operations of the portable device; and a user interface for enabling the user to program the central unit to execute a defined program comprising a plurality of instructions in sequence including at least a monitoring instruction and a recording instruction, wherein the user interface further enables the user to modify the defined program.

10. The portable device according to claim 9, wherein the memory comprises a plurality of specific zones and the reference linguistic expression is stored in one of the specific zones and the different type linguistic expression is stored in another of the specific zones.

11. The portable device according to claim 9, wherein the defined program comprises at least one iteration.

12. The portable device according to claim 9, wherein the monitoring instruction instructs feeding and retrieving means to retrieve at least one linguistic expression from memory and feed the linguistic expression to the monitoring means.

13. The portable device according to claim 9, wherein the signals recorded by the user are stored in the one of the specific zones that stores the reference linguistic expression.

14. The portable device according to claim 9, wherein the user interface comprises a selection key that activates scrolling of possible instructions on a display and a validation key that allows a selected display instruction to be entered.

15. The portable device according to claim 9, wherein the different type linguistic expression is in a language known to the user.

* * * * *